(12) United States Patent
Tickler

(10) Patent No.: US 11,671,547 B2
(45) Date of Patent: Jun. 6, 2023

(54) BUDGET CONTROL FOR PRINTING AND COPYING

(71) Applicant: Canon Europa N.V., Amstelveen (NL)

(72) Inventor: Chris Tickler, Harpenden (GB)

(73) Assignee: Canon Europa N.V., Amstelveen (NL)

( * ) Notice: Subject to any disclaimer, the term of this patent is extended or adjusted under 35 U.S.C. 154(b) by 0 days.

(21) Appl. No.: 17/374,266

(22) Filed: Jul. 13, 2021

(65) Prior Publication Data

US 2022/0021786 A1    Jan. 20, 2022

(30) Foreign Application Priority Data

Jul. 17, 2020    (GB) .................................. 2011080.5

(51) Int. Cl.
*H04N 1/34*    (2006.01)
*G06F 3/12*    (2006.01)
*G06Q 20/36*    (2012.01)

(52) U.S. Cl.
CPC .......... *H04N 1/346* (2013.01); *G06F 3/1222* (2013.01); *G06F 3/1239* (2013.01); *G06Q 20/363* (2013.01); *H04N 1/344* (2013.01)

(58) Field of Classification Search
None
See application file for complete search history.

(56) References Cited

U.S. PATENT DOCUMENTS

2011/0191197 A1    8/2011    VanWinkle et al.
2018/0357027 A1    12/2018    Kodimer

*Primary Examiner* — Lennin R Rodriguezgonzalez
(74) *Attorney, Agent, or Firm* — Canon U.S.A., Inc. IP Division

(57) ABSTRACT

A printing and copying system is provided that includes a server configured to manage user account information related to a user, and an apparatus connected to the server, the apparatus configured to send a printing request or a copying request to the server. The user account information includes a plurality of wallets associated with the user, and the plurality of wallets each represent funds available to the user. The server is configured to determine whether to authorise the printing request or copying request based on the funds available in the plurality of wallets.

19 Claims, 10 Drawing Sheets

Copying

BUDGET CONTROL FOR PRINTING AND COPYING

CROSS-REFERENCE TO RELATED APPLICATIONS

This application claims the benefit under 35 U.S.C. § 119(a)-(d) of United Kingdom Patent Application No. 2011080.5, filed on Jul. 17, 2020 and titled "Budget Control for Printing and Copying". The above cited patent application is incorporated herein by reference in its entirety.

TECHNICAL FIELD

The present invention relates to budget control for printing and/or copying.

BACKGROUND OF THE INVENTION

In many organisations and institutions, a multifunctional apparatus, or multifunction peripheral device (MFP), is provided to allow users to print and/or copy documents. In institutions such as schools, universities and colleges, budget control is often used to control the use of the MFP's. Such budget control ensures that a user has enough money, or funds, to print and/or copy at the MFP. If the user does not have enough funds/money, they are unable to print or copy documents.

Typically, the MFP's are connected, via a network, to a server that holds account information for each user. The account information includes a user's available funds. When a user instructs an MFP to print or copy, the MFP communicates with the server to determine whether the user has enough funds to print and/or copy. If the user has enough funds, the MFP performs the printing or copying.

In more conventional arrangements, the server is a local server that is typically located within, and may be managed by, the organisation/institution, and the MFP communicates with the MFP over a local network. A more recent trend is to move services that have been provided by local servers to the "cloud". Such services are typically accessed via the internet, and this is referred to as a cloud service. The cloud service can be considered a virtual server, due to the server functionality in fact being provided by any one of a plurality of online servers. Such a plurality of online servers is often referred to as a cloud, due to being located externally and remotely from the network. Thus, it is appropriate in this context to refer to the MFP being configured to exchange information with a cloud service. A cloud service can also be considered as a software (application) platform that provides an abstraction layer on top of the server (physical or virtual) layer. This is often referred to as true cloud (rather than hosted or virtualised servers). True cloud software is written to run on the platform and request, or release, resources as required. Existing or traditional server-based software is able to run on hosted, or virtualised, servers but are bound by the limits of resources of each individual server(s) often resulting in the requirement to manage multiple servers.

In many circumstances the institutions wish to provide the user with some free printing/copying. For example, a school may provide each of its pupils (users) a free £10 printing/copying allowance per term. To do this, money/funds are added to the user's account that is managed by the local server/cloud service. Funds/money may also be added to ("topped-up") by a user if they exhaust their free allowance.

It is often desired to manage the funds/money of a user in such a way that the source of funds/money is clearly identifiable. For example, in the context of a school, it may be desired at the end of term to refund a user/student for any of their own money they have added to their account. However, in conventional arrangements, such management of budget control is often difficult.

SUMMARY OF THE INVENTION

According to a first aspect of the present invention a printing and copying system is provided that includes a server configured to manage user account information related to a user, the user account information including a plurality of wallets associated with the user, and the plurality of wallets each representing funds available to the user; and an apparatus connected to the server, the apparatus configured to send a printing request for a print job, or a copying request for a copy job, to the server in accordance with an instruction from the user, wherein the server is configured to determine whether to authorise the printing request or copying request based on the funds available in the plurality of wallets.

According to a second aspect of the present invention a printing system is provided that includes a client computer configured to generate print data in response to an action from a user; a server connected to the client computer and configured to manage user account information related to the user, the user account information including a plurality of wallets associated with the user, and the plurality of wallets each representing funds available to the user; and a printing apparatus connected to the server and configured to send a request for the print data to the server in accordance with a print instruction from the user, wherein, the server is configured to determine whether the printing apparatus is authorised to receive the print data based on the funds available in the plurality of wallets.

According to a third aspect of the present invention a copying system is provided that includes a copying apparatus comprising a scanning device and a printing device; and a server connected to the copying apparatus and configured to manage user account information related to a user, the user account information including a plurality of wallets associated with the user, and the plurality of wallets each representing funds available to the user, wherein, in accordance with a copy instruction from the user, the scanning device is configured to scan a document to generate scanned data and send a copy request for printing the scanned data by the printing device to the server, and wherein the server is configured to determine whether to authorise the copy request based on the funds available in the plurality of wallets.

According to a fourth aspect of the present invention a printing and copying method is provided in a printing and copying system including a server connected to an apparatus. The method includes managing, at the server, user account information related to a user, the user account information including a plurality of wallets associated with the user, and the plurality of wallets each representing funds available to the user; sending a printing request for a print job or a copying request for a copy job from the apparatus to the server in accordance with an instruction from the user; and determining, at the server, whether to authorise the printing request or copying request based on the funds available in the plurality of wallets.

BRIEF DESCRIPTION OF THE DRAWINGS

Embodiments of the present invention will now be described, by way of example only, with reference to the accompanying figures.

DESCRIPTION OF THE EMBODIMENTS

Each of the embodiments of the present invention described below can be implemented solely or as a combination of a plurality of the embodiments or features thereof where necessary or where the combination of elements or features from individual embodiments in a single embodiment is beneficial.

First Embodiment

Figure 1:
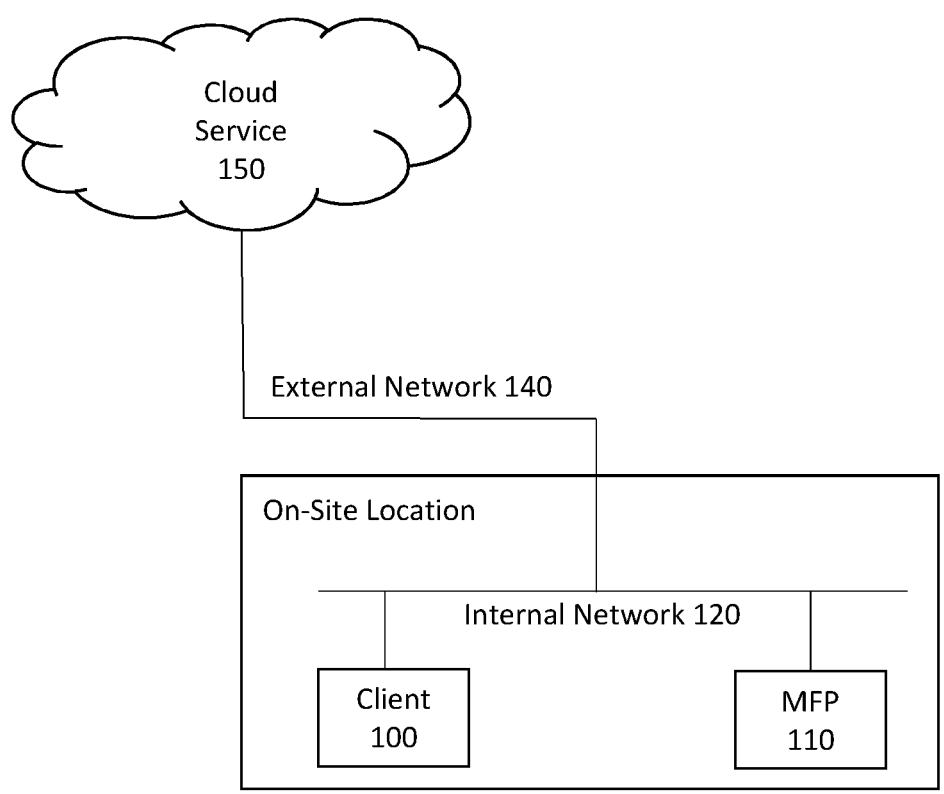
FIG. 1 illustrates an example of a printing and copying system.

FIG. 1 illustrates a printing and copying system provided for an on-site location. An example of an on-site location is a school. However, the on-site location is not limited to being a school, and the on-site location may be a university/college, business, library, home, or any organisation/institution where budget control of printing and/or copying is desired.

In the on-site location an MFP 110 is connected to a cloud service 150 via an internal network 120 and an external network 140. The MFP 110 may be considered as a printing apparatus and/or a copying apparatus, or as a multifunctional apparatus. The MFP 110, instead of being a multifunctional apparatus, may be a single functional device that, for example, prints only, copies only, or scans only. A client computer 100 can also be connected to the internal network 120, and it can communicate with the MFP 110 via the internal network 120, and communicate with the cloud service via the internal network 120 and external network 140. The client computer 100 does not need to be connected to the internal network (120), it can instead be connected to a sister internal network or external network (not shown). It is not necessary for the client computer 100 to be able to communicate with the MFP 110, in some embodiments it is only necessary that the client computer 100 and the MFP 110 are connected to, and communicable with or via, the cloud service 150.

The internal network 120 can be a wired network or a wireless network, and it can be simply called a "network" or a Local Area Network (LAN). The external network is typically the internet. The internal network 120 and external network 140 may be connected via a router (not shown).

The number of client computers 100 and MFP's 110 is not limited. The on-site location may include a plurality of MFP's 110 and client computers 100.

Figure 2:
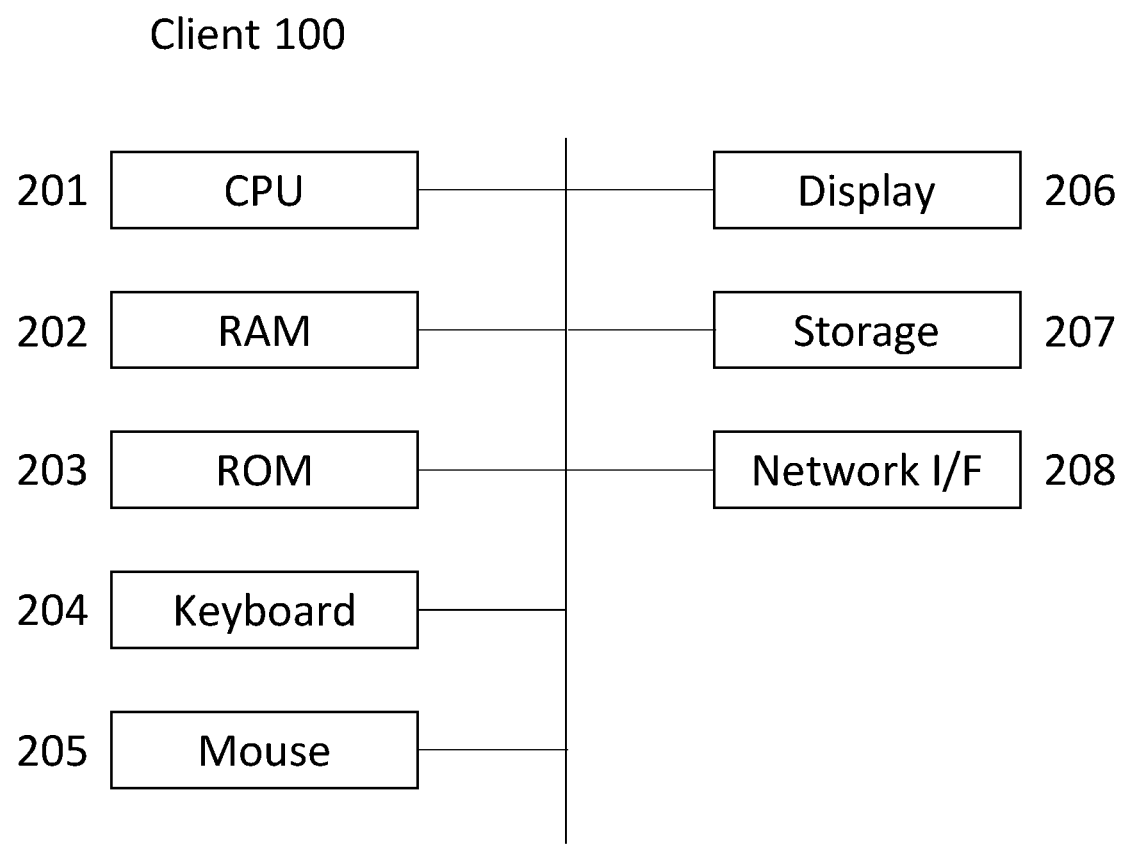
FIG. 2 illustrates an example of a hardware configuration of a client computer.

The client computer 100 is an example of an information processing apparatus, and in this embodiment, it is a general-use personal computer (PC). The PC may be a desktop computer or a laptop-computer. FIG. 2 shows selected standard components that may be present in the client computer 100 when the client computer is a PC. The client computer 100 has for example a CPU (Central Processing Unit) 201, a RAM (Random Access Memory) 202, a ROM (Read Only Memory) 203, a keyboard 204, a mouse 205, a display unit 206, an external storage device 207, and a network interface 208 which are all connected to each other via a bus. It is not necessary that all the components shown in FIG. 2 are present in the client computer 100 (for example, the ROM 203 may be a software ROM). Moreover, the client computer 100 is not limited to be being a PC. The client computer 100 may be a mobile telephone, tablet device, or any electronic device that is able to allow a user to select data to be printed.

The CPU 201 is a standard processor such as those available from Intel®, ARM®, or AMD®. The RAM 202 is a conventional RAM and is used as a temporary storage area for instructions being processed by the CPU 201. The ROM 203 is a memory that stores certain applications such as a document creation application for use by the client computer 100. The keyboard 204 and mouse 205 form input devices for the client computer 100 in a conventional manner. The display unit 206 is a TFT display for providing output display for a user. The external storage device 207 may be a removable USB hard disk drive. Network interface 208 is a set of standard components that allows the client computer 100 to communicate over the internal network 120. Such client computers are well known in the art and may include additional components (video cards etc.) or other components. In the case where the client computer 100 is a mobile telephone or tablet device (or other such portable device), the keyboard 204 and mouse 205 may take the form of a touchpad or touchscreen (or any other suitable input device) on the device. Voice recognition may also be used as an input device.

Figure 3:
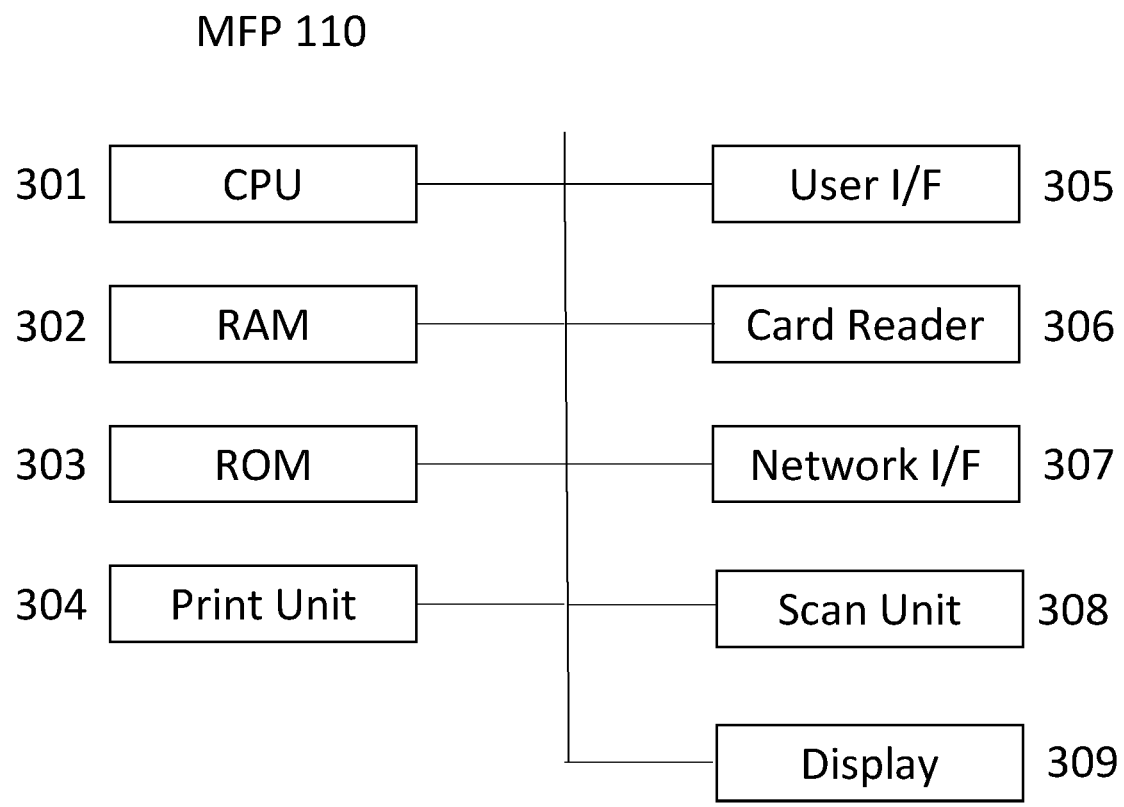
FIG. 3 illustrates an example of a hardware configuration of a multifunction peripheral.

FIG. 3 shows selected standard components that are present in the MFP 110. The MFP 110 has a CPU 301, a RAM 302, a ROM 303, a print unit 304, a user input/output 305, a card reader 306, a network interface 307, a scan unit 308, and a display 309 which are all connected to each other via a bus.

The CPU 301 is a standard processor such as those available from Intel® or AMD®. The RAM 302 is a conventional RAM and is used as a temporary storage area for instructions being processed by the CPU 301. The ROM 303 is a memory that stores certain applications for use by the MFP 110, such as the BIOS. The CPU 301 comprises a user interface generation unit that generates the user interface, which is then displayed by the display 309 of the MFP 110.

The print unit 304 could be implemented by an electrophotographic type printer engine or an inkjet type printer engine, and it can print an image on a printing media such as a paper based on the provided data. The scan unit 308 comprises hardware configured to capture the image of a document to be scanned.

The user input/output 305 includes a plurality of hardware buttons and software buttons which the user can select to provide input to the MFP 110. The user input/output 305 includes a touch screen as part of the display 309. The user input/output 305 includes a keyboard which can be used to enter alphanumeric text such as user ID and password information. Thus, the keyboard is a physical keyboard or a virtual keyboard. The display 309 includes a LCD display, together with touch sensors which provide touch screen functionality.

The user provides the MFP 110 with authentication information, in order to access services that are available from the MFP 110. For registered users, the authentication information corresponds to identification information, which associates the user with a user account.

The card reader 306 reads out user ID information from a contactless card. The readout ID is used to identify or authenticate the user who is operating the MFP 110. The user ID can be input into the MFP 110 by using a keyboard instead of the card reader 306. The authentication of the user can be performed in cooperation with a separately installed authentication server which is provided within each internal network 120.

Network interface 307 is a set of standard components that allows the MFP 110 to communicate over the internal network 120. Thus, the network interface 307 comprises an input unit and an output unit, which can be used by the MFP 110 to communicate with the client computer 100 and the cloud service 150.

Figure 4:
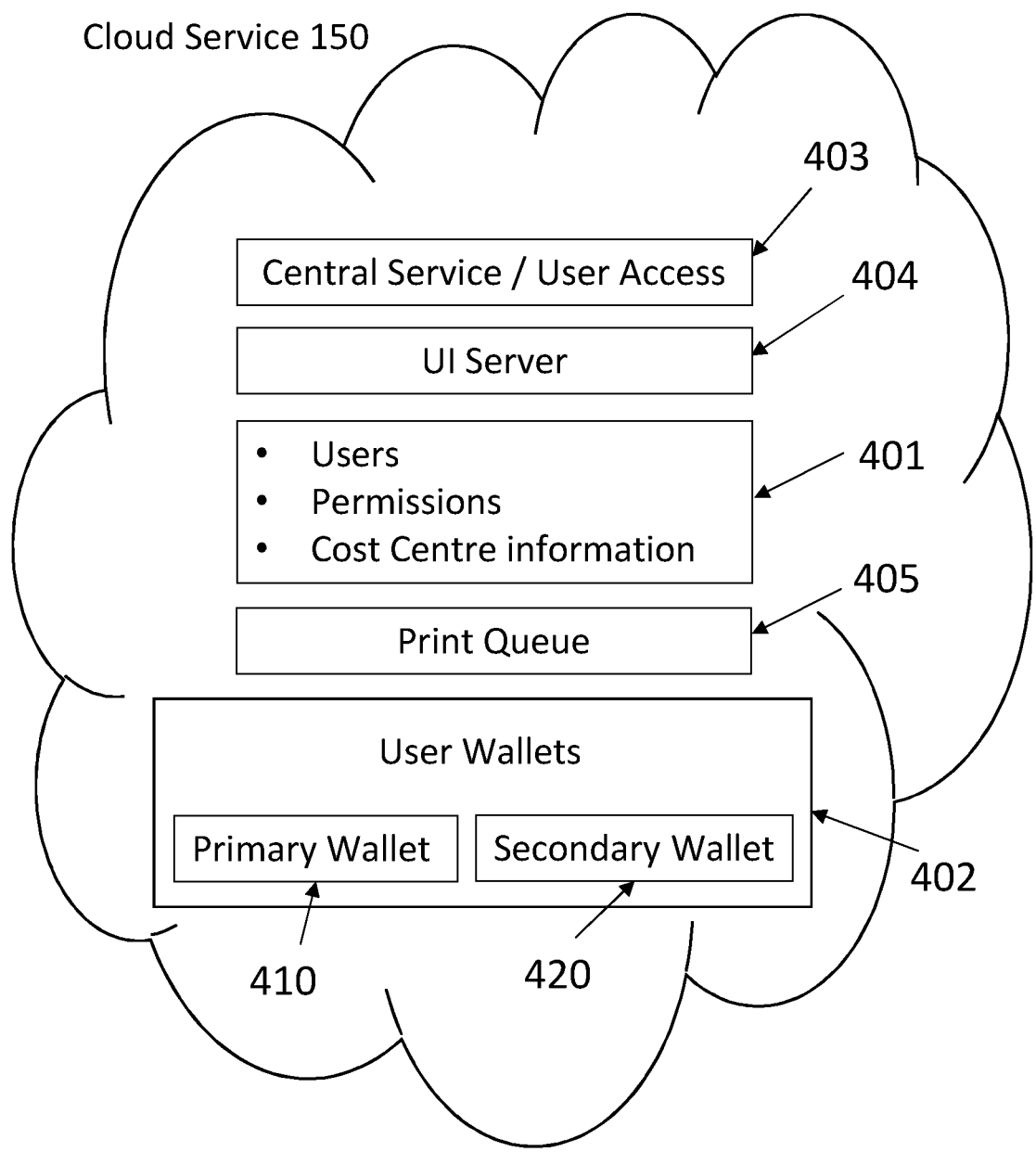
FIG. 4 illustrates an example of the services available on a cloud service.

FIG. 4 illustrates an example of the functions available on the cloud service 150. The cloud service 150 may be considered as a type of "server". In this application, "server" includes a physical server, an application server, a cloud service provided on hosted or virtualised servers, or a true cloud service. The functions on the cloud service 150 are typically provided by software applications running on one or more servers. The cloud service 150 holds information 401 that includes the identities of registered users of the print and copying system illustrated in FIG. 1. The idea of registered users in a print and copying system is known in the print and copying field and consists of those users who are registered within an authentication function of the system. The registered users may have differing authorisations, e.g. permission to print, copy or perform other operations within the system. Not all users may have the same permissions.

A registered user may log in to the cloud service 150 and update and change their account details. An administrator may log in to the cloud service 150, and the administrator may have permission to access, amend, and otherwise change one or more user accounts. Changes made by an administrator to permissions or to add/remove registered users are kept up to date in the cloud service 150.

In addition to the identity of the registered users, permissions of the users (e.g. print and copying permissions such as printing single/duplex or the ability to print colour/black and white), information about the print history of the user (e.g. volumes printed by the user etc.) and cost centre information (cost centre information allocated by a user against certain print or copy/scan activities) may be recorded.

Information 402 includes details of a user's wallets. In the present embodiments, a wallet is a virtual "wallet" or virtual "purse" assigned to each user that holds a user's allocated funds/money or credit for printing/copying. For example, the user's wallet may hold a fund/credit of £10, and each time a user prints a document, or copies a document, the funds/credit in the wallet is automatically deducted. Once a user's wallet is empty, the user will not be able to print or copy any document. A user, and/or an administrator, can add funds/credit to their wallet. The funds/credit in the wallets may be money or may be some sort of "credit token". Furthermore, the funds/credit may instead of representing money, may be a "number of pages". If "number of pages" is used, then there may need to be a way of differentiating between printing/copying black and white or colour documents. For example, one page of colour printing/copying may be considered to be equivalent to two pages of black and white printing/copying.

Each user is assigned two wallets. A first wallet is termed a primary wallet 410, and the second wallet is termed a secondary wallet 420. The value (funds/credit) of each wallet for a user added together makes the total available budget for the user. Typically, the funds/credit in the primary wallet 410 is used before the funds/credit in the secondary wallet 420. In other words, the funds available in the first wallet take preference over the funds in the second wallet, and the secondary wallet 420 is used once the funds/credit in the primary wallet 410 are exhausted. In some situations, funds may be taken from both wallets. For example, in cases when there are some funds in the primary wallet, but the funds in the primary wallet are not enough on their own, the funds in the primary wallet and secondary wallet are combined, and if such combination of funds is enough, then the respective amounts are reduced from the primary wallet and secondary wallet. The present embodiments are not limited to two wallets per user, more than two wallets may be provided if desired. A discussion of the use of the wallets will be described in more detail below.

A central service and user access function 403 on the cloud service 150 is configured to provide configuration information for the MFP 110 and/or client 100, and a user access function. The user access function includes a database storing the identity of the registered users and print/copying permissions mentioned above. When a request is received from a client computer 100 or MFP 110 to access the cloud service 150, the user access function 403 checks the received user name and password or other authentication information such as a token against the database of registered users and only allows access to further functions of the cloud service 150 if the user name and authentication match a registered user.

The cloud service 150 also has a user interface (UI) server function 404 and the MFP 110 may be configured to be served UI pages from the cloud service 150.

The cloud service 150 further includes a print queue 405 for storing print jobs for printing.

Figure 5:
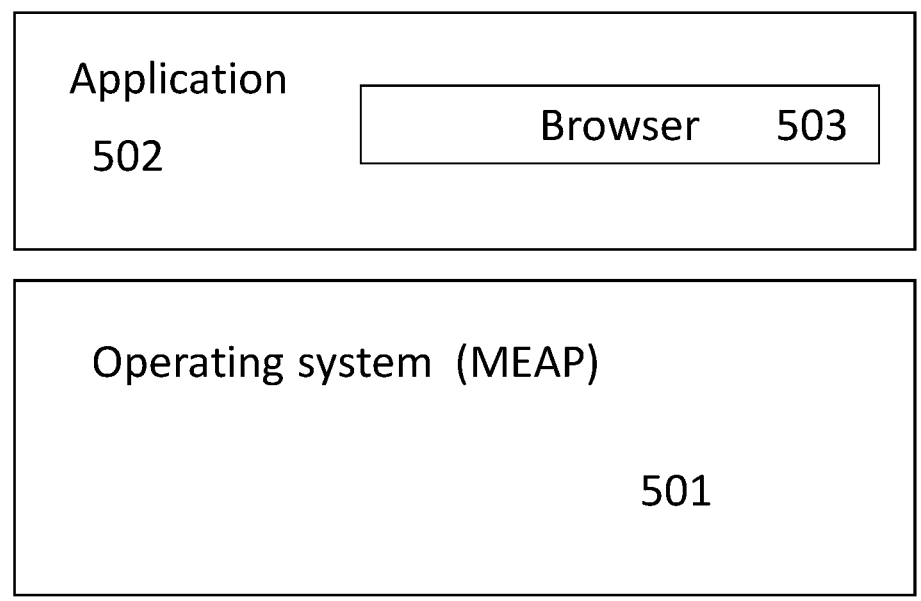
FIG. 5 illustrates an example a software configuration on a multifunction peripheral.

FIG. 5 shows an example of software that may be installed on the MFP 110. The MFP 110 has a Java®-based operating system 501 installed. On the operating system 501 it is possible to install software applications 502. In the present embodiments, the MFP 110 at least has a single UI application 502 installed. This UI application includes a browser 503 and functions to allow the MFP 110 to connect to the UI server 404 of the cloud service 150, to be served UI display pages. In this way, the UI of the MFP 110 is sent pages/data by the cloud service 150. The MFP 110 can display print jobs stored in the print queue 405 of the cloud service 150 and the user can release jobs to MFP 110 for printing. As noted above, the MFP 110 is not limited to be a multifunctional apparatus, it can be a single function device. It is not necessary for the browser 503 to be provided. Alternatively, the MFP 110 may include only a single application that is a browser.

The skilled person will understand that the print and copying work flows now described below with reference to FIGS. 6 to 9 are illustrative, and the print and copying workflows may be varied according to needs.

Figure 6A:
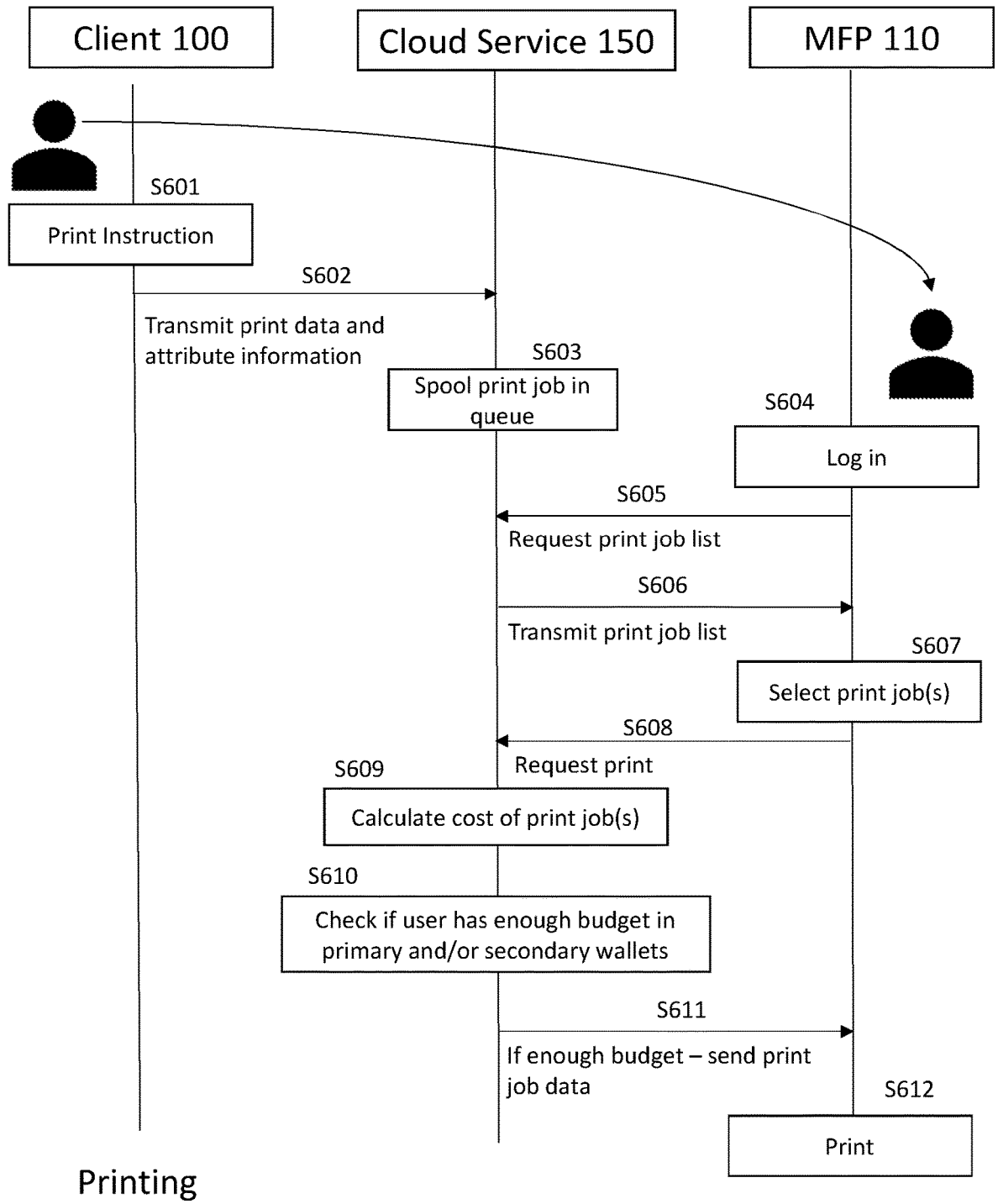
FIGS. 6a and 6b are sequence diagrams showing the process flow for printing in the printing and copying system.

FIG. 6a shows a sequence diagram illustrating a printing method. In step S601, the user operating the client computer 100, and wishing to print a document, instructs to print data.

This instruction can be issued by an editing program installed in the client computer 100. Such an application includes but is not limited to a word processing application, spreadsheet software, picture editing software and a web browser. The document that the user wishes to be printed may be stored on the client computer 100, or stored on a cloud-based storage system that the client computer 100 (or cloud service 150) has access to.

The client computer 100 sends an access request (not shown) to the cloud service 150. The access request includes user identification and authentication information which is processed by the user access function 403 of the cloud service 150. The user access function 403 checks the received identification and authentication information. If the information corresponds to that of a registered user, the access request is successful. The user access on the client 100 may be performed before the user decides to print a document.

If the user access request is successful, in step S602, print data and attribute information relating to the document/data to be printed is transmitted from the client computer 100 to the cloud service 150. The transmitted print data and attribute information is used by the cloud service 150 to create a print job and this is then spooled and stored in the print queue 405 on the cloud service 150 in step S603. The attribute information may include information such as the identity of the user who requested the printing and information about print settings, such as number of pages, number of copies, black and white or colour printing, duplex printing, paper/media type, paper size, stapling options, finishing etc. The attribute information may include any information that is related to a user and/or print data. Although, it has been described that the print data is sent from the client computer 100 to the cloud service 150, in some embodiments, this is not necessary. This will be discussed in more detail below.

The user who operated the client computer 100 then moves to the location where the MFP 110 is located, and logs into the MFP 110 for example by using a contactless card in step S604. This involves a request by the MFP 110 to the user access function 403 of the cloud service 150. The request may include a certificate, number or identifier related to the user's user account, that is obtained from the contactless card. Instead of using a contactless card, the user may log in to the MFP 110 using a username and password that are entered at the MFP 110, or by the MFP 110 reading biometric information, such as a fingerprint or image of a user's face. Alternatively, a mobile device may be used to log in. This may be achieved by entering of a username and password, or reading of biometric information (e.g. fingerprint reader), at the mobile device. Alternatively, the mobile device may use a mobile application and Bluetooth™ reader, or the user may log in by scanning a code (e.g. barcode or QR-code) with a mobile device. In the case of using a mobile device, an application running on the mobile device authenticates a user to the cloud service 150, and the cloud service 150 then authorises the user to use the MFP 110. Other suitable ways of logging in may be used.

Once the user has successfully logged into the MFP 110 (i.e. the authentication of the user was successful), the user is allowed to use the functions of the MFP 110. One of the functions of the MFP 110 is "print", and when the user selects "print", in step S605 the MFP 110 requests the cloud service 150 for a list of the print jobs stored in the print queue 405 and belonging to the logged in user. This list contains the names of print jobs having attribute information indicating that the cloud service 150 received the print job data and attribute information from the logged in user.

In step S606, the requested list of print jobs is transmitted from the cloud service to the MFP 110. In step S607, the print job list provided by the cloud service 150 is displayed on the display screen 309 of the MFP 110. The names of print jobs are displayed on the display screen 309 so that the user can easily select a print job which he or she wishes to print.

In step S607, the user selects a print job using the user interface 305, and in step S608, the MFP 110 sends a request to the cloud service 150 to print the selected print job. In step S607 the user may select one or more print jobs from the displayed print job list. If the user selects more than one print job, in step S608 the MFP 110 sends a request to the cloud service 150 for printing each of selected print jobs separately. Each of the selected print jobs are treated individually and are dealt with in turn.

In step S609 the cloud service 150 calculates the cost of the selected print job. For example, the cloud service 150 may calculate the cost based on the number of pages to be printed and on attributes such as colour or black and white printing. Any suitable method of calculating the print job cost may be used. The calculated print job cost may be a "monetary value" (for example a currency (e.g. "£")), a "token value", or it may be the number of pages to be printed. If more than one print job has been selected by the user, then the cloud service 150 calculates the cost of each selected print job separately and in turn.

If the calculated print job cost is the number of pages to be printed, then it may be desired to consider the difference in cost between black and white printing and colour printing. This could be achieved by counting one page of colour printing as being equivalent to two-pages of black and white printing. Of course, it is not limited to this ratio of 1:2 (B+W/colour), any suitable ratio may be used.

It is not always necessary for the cloud service 150 to calculate the print job cost, in some arrangements it may be preferable for the MFP 110 to calculate the print job cost. The MFP 110 may calculate the print job cost in a similar manner to the cloud service 150. In this case, the calculated print job cost is sent by the MFP 110 to the cloud service 150 at the same time as sending the requested print job in step S608.

In step S610 the cloud service compares the calculated print cost to the user's budget available in the user's wallets 402, to determine whether the user has enough funds/credit for the selected print job. This process will be described in more detail below with reference to FIG. 8.

If the user does have enough funds/credit for the selected print job, in step S611, the cloud service 150 authorises the print job, sends the print data for the specific print job from the print job queue in the cloud service 150, and removes the appropriate funds from the user's wallets.

If more than one print job has been selected by the user, the cloud service 150 determines whether each of the selected print jobs is authorised separately and in turn. If a first print job is authorised, in step S611 the cloud service 150 authorises that print job, sends the print data for that specific print job from the print job queue in the cloud service 150, and removes the appropriate funds from the user's wallets for that specific print job. The MFP 110 then sends a request to the cloud service 150 for the second print job, and this is repeated for all the selected print jobs. In this manner, steps S608 to S611 are repeated until all the selected print jobs are dealt with.

Step S611 may include converting, by the cloud service 150, the print data from a generic PCL file format in which it was sent to the queue 405 by the client 100 into a print language that is accepted by the MFP 110. This conversion is performed by means of device information files (DIF files) stored on the cloud service.

In step S612, printing is performed at the printer unit 304 of the MFP 110 based on print job data received from the cloud service 150. In this embodiment, the print data may be stored on the client computer 100 and received by the MFP 110 via the cloud service 150. Alternatively, the MFP 110 may receive the print data direct from the client computer 100 and only the print job attribute information is sent to the cloud service 150 (see discussion of FIG. 6b below). In further embodiments where the data/document to be printed is stored on a cloud-based storage system that the client computer 100 (or cloud service 150) has access to, the print data may be received by the MFP 110 via the client computer 100 or cloud service 150, or the MFP 110 may receive the print data direct from the cloud-based storage system.

Figure 6B:
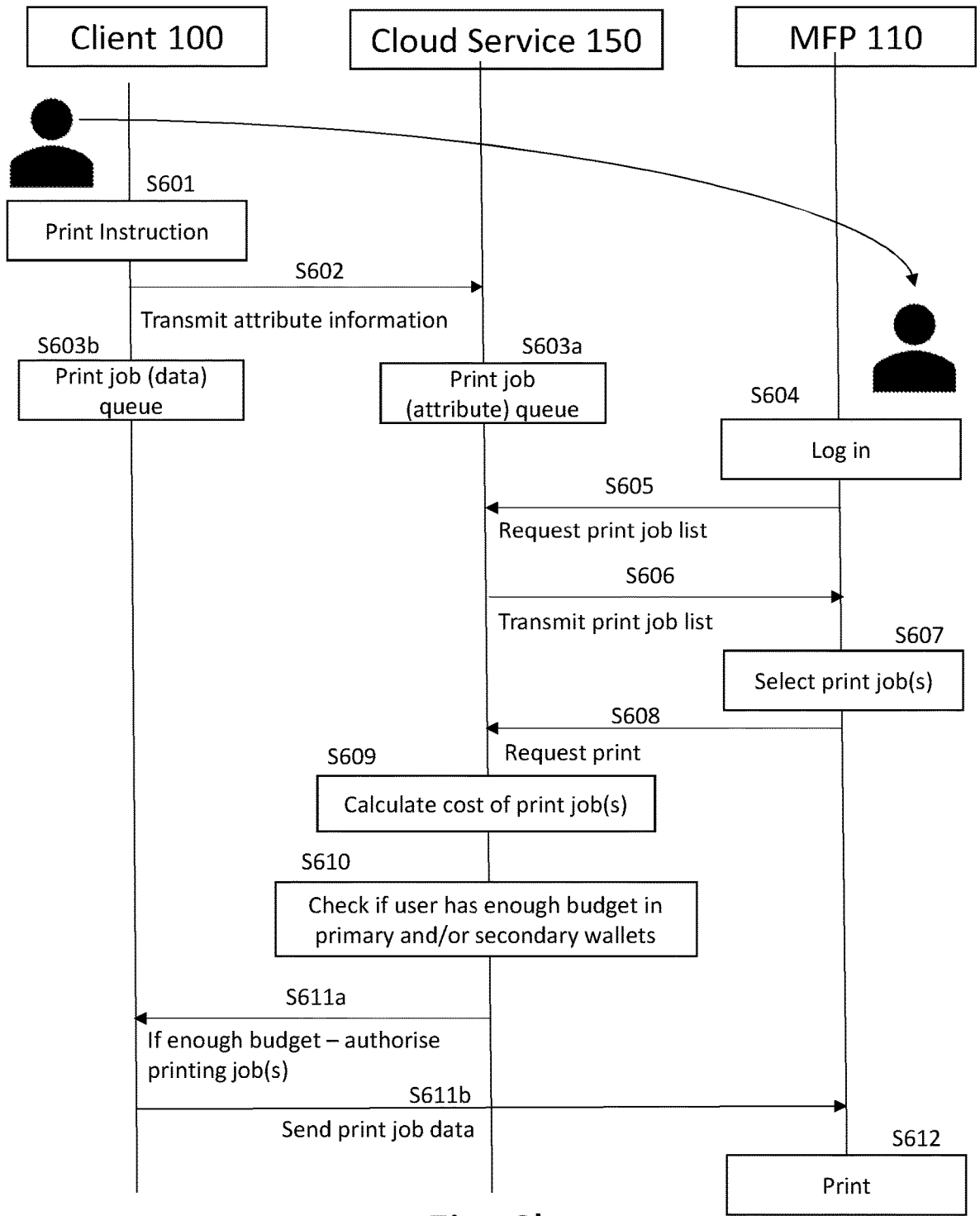

After the printing of the print job is performed, the cloud service 150 may send an enquiry to the MFP 110 to check if the printing was successful (not shown in FIG. 6a or 6b). For example, there may have been a paper jam, network issue or power failure before the print job could be completed, and it would not be desirable to charge a user for any such errors. If such an error occurred during the printing of the print job, typically the cloud service 150 will refund an appropriate amount to the user's wallet (e.g. the cost of any pages that were not printed). Alternatively, or addition, the cloud service 150 may authorise the complete reprinting, or partial reprinting (i.e. the number of missing pages), of the print job. Instead of the cloud service 150 sending an enquiry to the MFP 110, the MFP 110 may send an acknowledgement, or completion report, to the cloud service 150 each time a print job is complete, so that the cloud service 150 may determine whether the print job, or print jobs, were correctly printed.

Although not shown in FIG. 6a, if in step S610 it is determined that the user does not have enough funds for the selected print job, the user is not authorised to print the print job, and the cloud service 150 does not send the authorisation notification (S611) and/or the print data to the MFP 110, nor are any fees removed from the user's wallet(s). In this case the cloud service 150 may send an instruction to the MFP 110 to display an error message such as a message informing the user that they do not have enough funds for the selected print job. Alternatively, the cloud service 150 may simply send a notification to the MFP 110 that the print job is not authorised, and the MFP 110 may generate the error message to be displayed to the user based on the operating system 501 and/or the application 502. If more than one print job has been selected by the user, and the user has enough funds for some but not all the selected print jobs, because the selected print jobs are dealt with individually, the cloud service 150 will authorise the each print job in turn until the user does not have enough funds. The user will be informed of the print jobs for which they do not have enough funds.

In the above discussed embodiment in relation to FIG. 6a, in step S602 the client computer 100 sends the print data and attribute information to the cloud service 150, and the attribute information is used by the cloud service 150 to create an entry for the print job in the print queue 405. However, in another embodiment, it is not necessary for the client computer 100 to send the print job data and/or attribute information to the cloud service 150. As shown in FIG. 6b, in step S602 the client may transmit only the attribute information to the cloud service 150, and in step S603b the client computer 100 may be configured to maintain its own local print queue that is based on the print data, for example a "print job data queue". In step S603a the cloud service 150 creates a print job queue based on the attribute information (e.g. a "print job attribute queue"). Steps S604 to S610 follow in the manner described above in relation to FIG. 6a. If the print job is authorised, instead of the described step S611, in step S611a the cloud server 150 will notify the client computer 100 that the print job is authorised, and the client computer 100 will then transmit in step S611b the print job data directly to the MFP 110 for printing. Alternatively, the print job data may be transmitted to the MFP 110 via the cloud service 150, but in this case the print job data will only be temporarily stored on the cloud service 150. In further embodiments the client computer 100 may be configured to only send information on a print job list, which itself maintains based on the print data and/or attribute information, to the cloud service 150. Alternatively, based on a notification of the selected data/document to be printed received at the cloud service 150 from the client computer 100, the cloud service 150 may receive the print data and/or attribute information from a cloud-based storage system. In another embodiment, the MFP 110 may receive the attribute information from the client computer 100 or from a cloud-based storage system, and then send this to the cloud service 150. As long as the cloud service 150 is able to at least temporality store a list of print jobs available to a user, and have enough information to calculate the cost of the print jobs, any means of communication of the print data and/or attribute information related to a document/data to be printed may be used.

Figure 7:
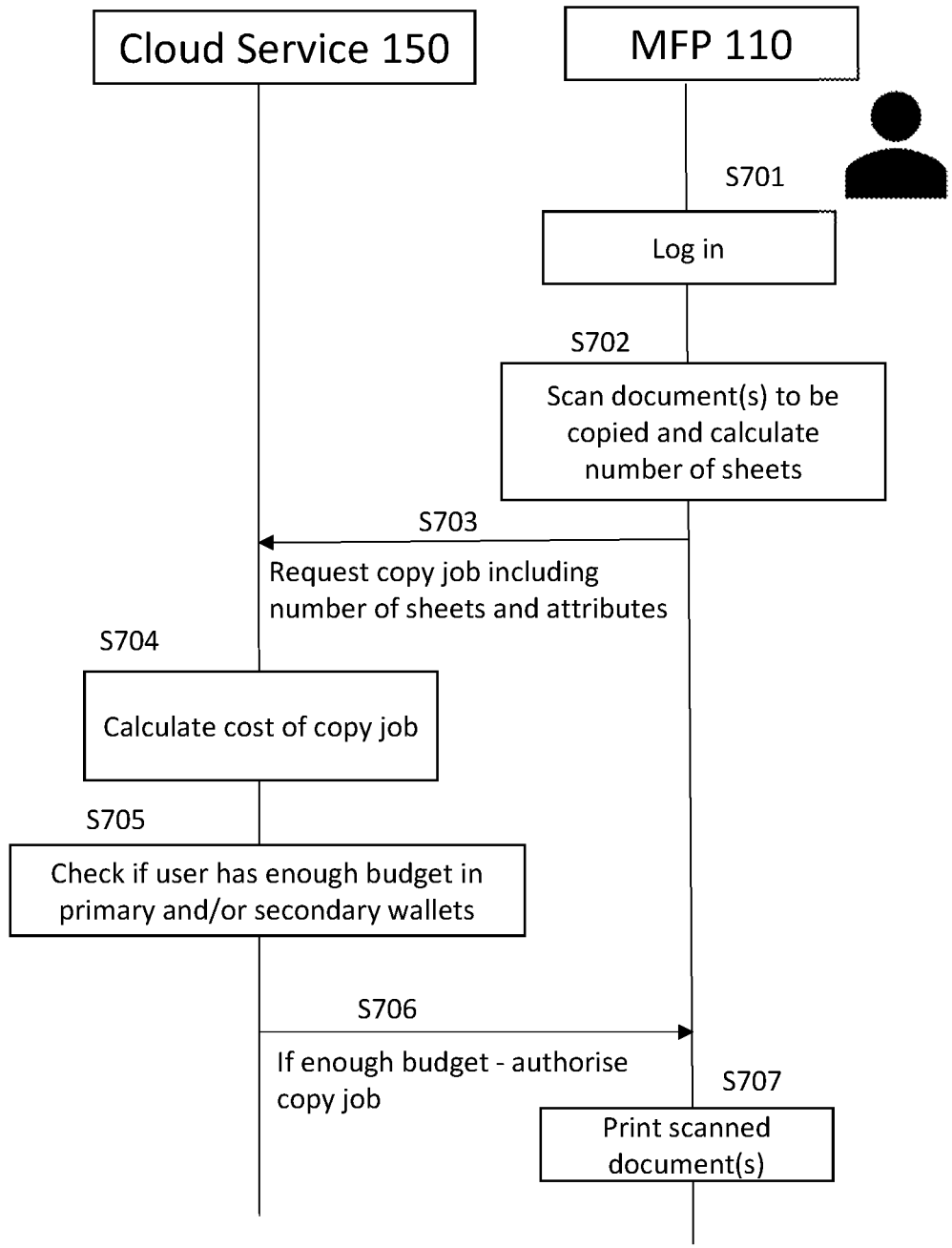
FIG. 7 is a sequence diagram showing the process flow for copying in the printing and copying system.

FIG. 7 shows a sequence diagram illustrating a copying method. In step S701 the user logs into the MFP 110 by using a contactless card (or any other log in/authentication method). The log in process involves the MFP 110 sending a user access request to the user access function 403 of the cloud service 150 including login information retrieved from the user's contactless card. If the login information matches a registered user in the database of the user access function 403 of the cloud service 150, the login is successful. Instead of using a contactless card, the user may log in to the MFP 110 using a username and password that are entered at the MFP 110, or by the MFP 110 reading biometric information, such as a fingerprint or image of a user's face. Alternatively, a mobile device may be used to log in. This may be achieved by entering of a username and password, or reading of biometric information (e.g. fingerprint reader), at the mobile device. Alternatively, the mobile device may use a mobile application and Bluetooth™ reader, or the user may log in by scanning a code (e.g. barcode or QR-code) with a mobile device. In the case of using a mobile device, an application running on the mobile device authenticates a user to the cloud service 150, and the cloud service 150 then authorises the user to use the MFP 110. Other suitable ways of logging in may be used.

Once the user has successfully logged into the MFP 110 (i.e. the authentication of the user is successful), the user can use one or more of the functions of the MFP 110. One of the functions on the MFP 110 is "copy", and in step S702 when the user selects "copy", the MFP 110 instructs the user to scan the document(s) they wish to copy. The user locates the document(s) on to the scan unit 308 of the MFP 110 and instructs the MFP 110 to scan the document(s). The scan unit 308 may include both a "flat bed" scan part for scanning a single page of a document at a time, and a "feed-in" scan part that can scan multiple pages of a document (single sided and/or double sided) at a time. The "flat bed" scan part may be used for copying individual pages from books for example. The MFP 110 stores the image(s) of the scanned document(s) in its memory (e.g. RAM 302) as scanned image data.

Once the scan of the document(s) is complete, the MFP calculates the number of sheets that are to be copied, or in other words the number of sheets that are to be printed by the print unit 304. The MFP 110 also determines the number of copies of the scanned document(s) to be made based on user input. For example, the document to be copied may include five pages and the user may wish to make three copies of the five-page document, and thus fifteen pages in total are to be printed (copied). The MFP 110 also records any attributes of the desired copy entered by the user at the user interface 305. For example, the attributes may indicate whether the copies are to be made in colour or black and white, whether double sided printing is to be performed, the type of paper to be used, and other finishing options. In step S703 the MFP 110 sends a request for the copy job to the cloud service 150, together with the calculated number of sheets (and attributes).

In step S704 the cloud service calculates the cost of the copy job. For example, the cloud service 150 may calculate the cost based on the number of pages to be printed/copied and on attributes such as colour or black and white printing. Any suitable method of calculating the copy job cost may be used. The calculated copy job cost may be a "monetary value" (for example a currency (e.g. "£")), a "token value", or it may be the number of pages to be printed.

If the calculated copy job cost is the number of pages to be printed/copied, then it may be desired to consider the difference in cost between black and white printing and colour printing. This could be achieved by counting one page of colour printing as being equivalent to two-pages of black and white printing (a B+W/colour ratio of 1:2). Of course, it is not limited to this ratio of 1:2 (B+W/colour), any suitable ratio may be used.

It is not always necessary for the cloud service 150 to calculate the copy job cost, in some arrangements it may be preferable for the MFP 110 to calculate the copy job cost. The MFP 110 may calculate the copy job cost in a similar manner to the cloud service 150. In this case, the calculated copy job cost is sent by the MFP 110 to the cloud service 150 at the same time as sending the requested copy job in step S703.

In step S705 the cloud service compares the calculated copy job cost to the user's budget available in the user's wallets 402, to determine whether the user has enough funds/credit for the desired copy job. This process will be described in more detail below with reference to FIG. 8.

If the user has enough funds/credit for the copy job, in step S706, the cloud service 150 notifies the MFP 110 that the copy job is authorised and removes the appropriate funds from the user's wallet(s). In step S707, the MFP 110 reads out the scanned image data of the document(s) stored in its memory (RAM 302) and sends this to the print unit 304 for printing. Thus, the scanned document(s) is printed/copied. After the scanned document(s) are printed by the print unit 304, the cloud service 150 may send an enquiry to the MFP 110 to check if the copy job was performed successfully (not shown in FIG. 7). For example, there may have been a paper jam, network issue or power failure before the copy job could be completed, and it would not be desirable to remove funds from a user's wallet(s) if there is any such error. If such an error occurred during the printing of the copy job, typically the cloud service 150 will refund an appropriate amount to the user's wallet (e.g. the cost of any pages that were not printed). Alternatively, or in addition, the cloud service 150 may authorise the complete reprinting, or partial reprinting (i.e. the number of missing pages), of the copy job. Instead of the cloud service 150 sending an enquiry to the MFP 110, the MFP 110 may send an acknowledgement, or completion report, to the cloud service 150 each time a copy job is complete, so that the cloud service 150 may determine whether the copy job was correctly performed.

Although not shown in FIG. 7, if in step S705 it is determined that the user does not have enough funds for the desired copy job, the user is not authorised to complete the copy job, and the cloud service 150 does not send an authorisation to the MFP 110. In this case the cloud service 150 may send an instruction to the MFP 110 to display an error message such as a message informing the user that they do not have enough funds for the copy job. Alternatively, the cloud service 150 may simply send a notification to the MFP 110 that the copy job is not authorised, and the MFP 110 may generate the error message to be displayed to the user based on the operating system 501 and/or the application 502.

Figure 8:
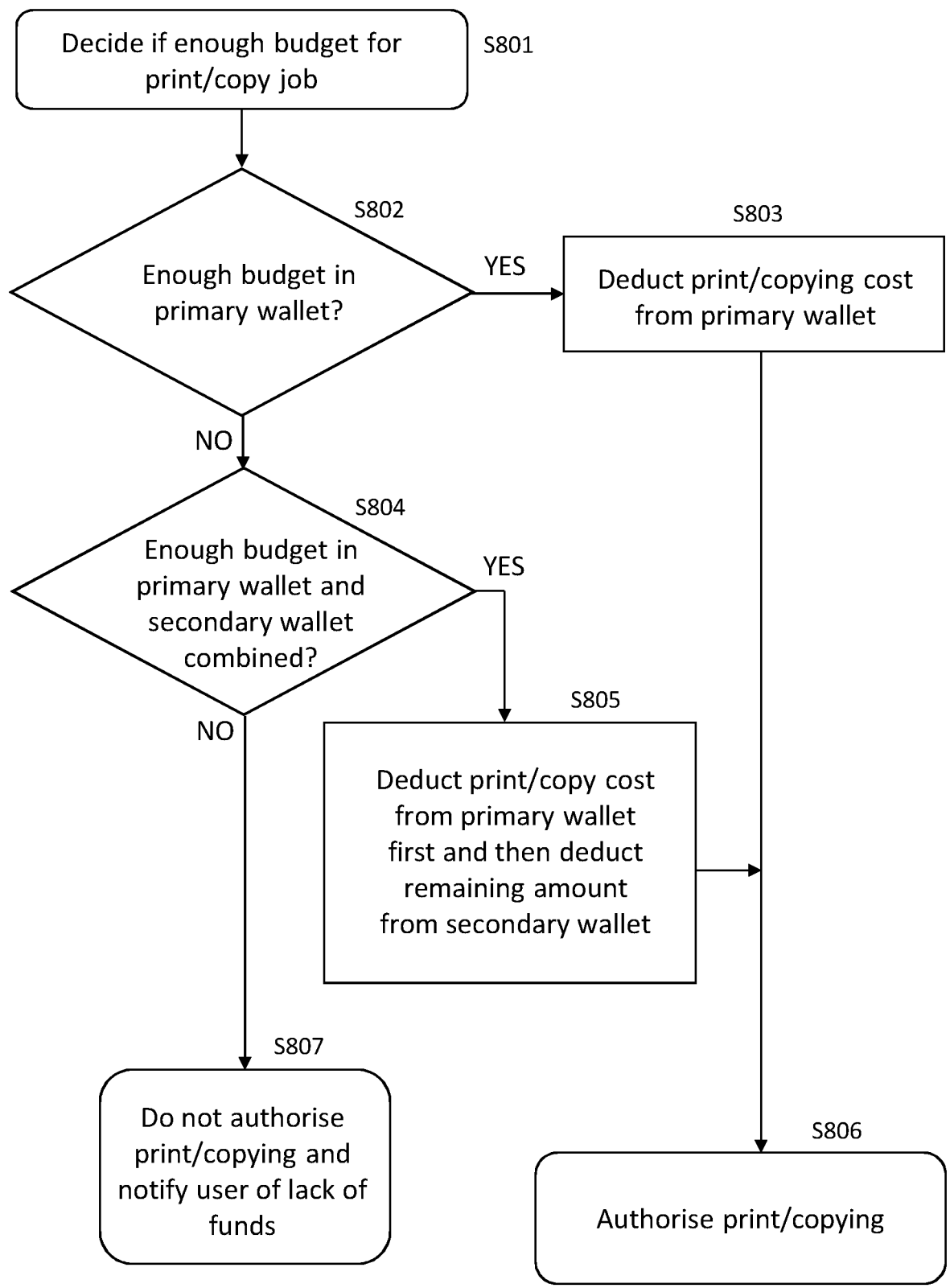
FIG. 8 is a flow diagram showing the steps for deciding if a user has enough funds for a print job or copy job.

FIG. 8 describes in more detail the determination of whether a user has enough funds to perform the selected print job (the determination in step S610 of FIG. 6) or complete a desired copy job (the determination in step S705 of FIG. 7).

Step S801 of FIG. 8 represents step S610 (FIG. 6) and step S705 (FIG. 7). In step S802 the cloud service 150 compares the print/copy job cost with the user's available funds in the primary wallet 410. If the funds available in the primary wallet is equal to or greater than the calculated cost of the print/copy job cost, then it is determined that there are enough funds in the primary wallet and the flow proceeds to step S803. If the funds available in the primary wallet is less than the cost of the print/copy job cost, it is determined that there are not enough funds for the print/copy job in the primary wallet 410 and the flow proceeds to step S804.

In step S803 the print/copy job cost is deducted from the funds in the primary wallet 410. In other words, the funds in the primary wallet 410 are reduced by the amount of the print/copy job cost. For example, consider the case where the print/copy job cost is £1, and the available funds in the user's primary wallet 410 is £3. In this example, the funds available in the primary wallet 410 will be reduced by £1 to a value of £2. Once the funds in the primary wallet 410 are updated/reduced the flow proceeds to step S806.

If there are not enough funds in the primary wallet 410, in step S804 the cloud service 150 compares the print/copy job cost with the user's combined available funds in the primary wallet 410 and secondary wallet 420. The funds available in the primary wallet 410 and secondary wallet 420 are added together and compared with the print/copy job cost. If the user's combined available funds match or exceed the print/copy job cost, then it is determined the user has enough combined funds for the print/copy job and the flow proceeds to step S805. For example, consider the case where the print/copy job cost is £2, the available funds in the user's primary wallet 410 is £1, and the available funds in the user's secondary wallet 420 is £5. In this example, the user does not have enough funds in just the primary wallet 410 to perform the print/copy job, but the combined funds of £6 is enough to cover the cost of the print/copy job.

If the combined fund is less than the print/copy job cost, then it is determined that the user does not have enough combined funds for the print/copy job and the flow proceeds to step S807.

In step S805 the print/copy job cost is first deducted from the funds in the primary wallet 410, and then any remaining amount of the print/copy job cost is deducted from the secondary wallet 420. For example, consider the example given above where the print/copy job cost is £2, the available funds in the user's primary wallet 410 is £1 and the available funds in the user's secondary wallet 420 is £5. In this case, the available funds in the primary wallet 410 will be reduced to £0 and the funds in the secondary wallet reduced to £4. If the primary wallet 410 is empty, the whole amount is deducted from the secondary wallet 420. Once the funds in the primary wallet 410 and secondary wallet 420 are updated/reduced the flow proceeds to step S806.

In step S806 the print job or copy job is authorised. Step S806 corresponds to step S612 of FIG. 6 and step S707 of FIG. 7.

In step S807, the user does not have enough funds and so the selected print job or the desired copy job are not authorised. The cloud service 150 notifies the MFP 110 that the jobs are not authorised, and an error message is displayed on the display 309 of the MFP 110 informing the user the print job or copy job cannot be performed because of lack of funds.

The above has described the use of a primary wallet 410 and a secondary wallet 420. In the example where the on-site location is a school (and many other institutions) it is often desirable to give each student free funds before the student needs to use their own money. In such a case, the primary wallet 410 represents the school provided funds, and the secondary wallet 420 represents the student/user provided funds. At the start of each school term (for example) the school may provide each student with £10 in their primary wallet 410. A student's total budget is the combined funds in the primary wallet 410 and the secondary wallet 420. When the funds in the primary wallet 410 run out, any money added to the secondary wallet 420 by the student will then be used. Thus, the school provided funds will always be used before the student's own money is used.

In the embodiment, two wallets are provided for each user. This provides the ability to separate the source of the money/credits for users. In the example discussed above, in a school the student may be given £10 of printing credit each term in their primary wallet, and the student can also use their own money to add more funds to their secondary wallet if required. In a conventional single budget/wallet system, it is not possible, or at least difficult, to calculate at the end of the term any refund that is due to a student for any of their own money as it is all mixed up with the school provided funds. In the multiple wallet system of the embodiments, the school provided funds are placed in the primary wallet (which is always used first to deduct from) and the student funds are placed in the secondary wallet (which is only used when the primary wallet is empty). In this case, at the end of the term, the student can simply be refunded the value of the secondary wallet regardless of how much money is available in the primary wallet.

In the examples given above, the print job cost is given as a monetary value. But the embodiments are not limited to this. The "funds" in the primary wallet 410 and secondary wallet 420 may be number of pages or some form of "token". For example, the primary wallet 410 may have a fund of 20 pages and the secondary wallet 420 may have a fund of 40 pages.

Second Embodiment

In the first embodiment the funds in the primary and secondary wallets are in the same form, but it is not necessary for the funds in the primary wallet and secondary wallet to be in the same form. In this embodiment, the funds in the primary wallet 410 are pages, and the funds of the secondary wallet 420 are a monetary value. Moreover, in this embodiment, two primary wallets and a secondary wallet are provided.

In the example where the on-site location is a school, consider an example where a school provides each student with a budget for black and white printing/copying, and a budget for colour printing/copying. In this case, the school (administrator) will provide a student's fund in the primary wallet 410 with a certain amount of colour and black and white pages, and the secondary wallet 420, managed by the student, will be "money". At the start of term, for example, the student will be provided with 10 colour pages and 50 black and white pages in the primary wallet 410. The student can add "money" to their secondary wallet 420.

It this embodiment, it is desirable to provide each student with three wallets, a colour primary wallet, a black and white primary wallet, and a secondary wallet. The funds in the colour primary wallet and black and white primary wallet are considered separate and are not combined when performing step S804 of FIG. 8. In other words, if colour pages are to be printed, only the colour primary wallet is used, and if black and white pages are to be printed then only the black and white primary wallet is used.

When printing/copying is performed, the colour and black and white pages are deducted from the respective colour and black and white primary wallet. If a student's free colour page fund in the colour primary wallet is empty and they wish to print/copy in colour, then the cost of printing/copy in colour will be deducted from their secondary wallet (if the secondary wallet includes enough funds). If the student wishes to print/copy in colour but their colour primary wallet and secondary wallet do not have enough funds, the student will not be able to print in colour (even if there are funds available in the black and white primary wallet). In such a case the student could be provided with the option of printing in black and white instead (if they have enough funds for black and white printing/copying).

Figure 9:
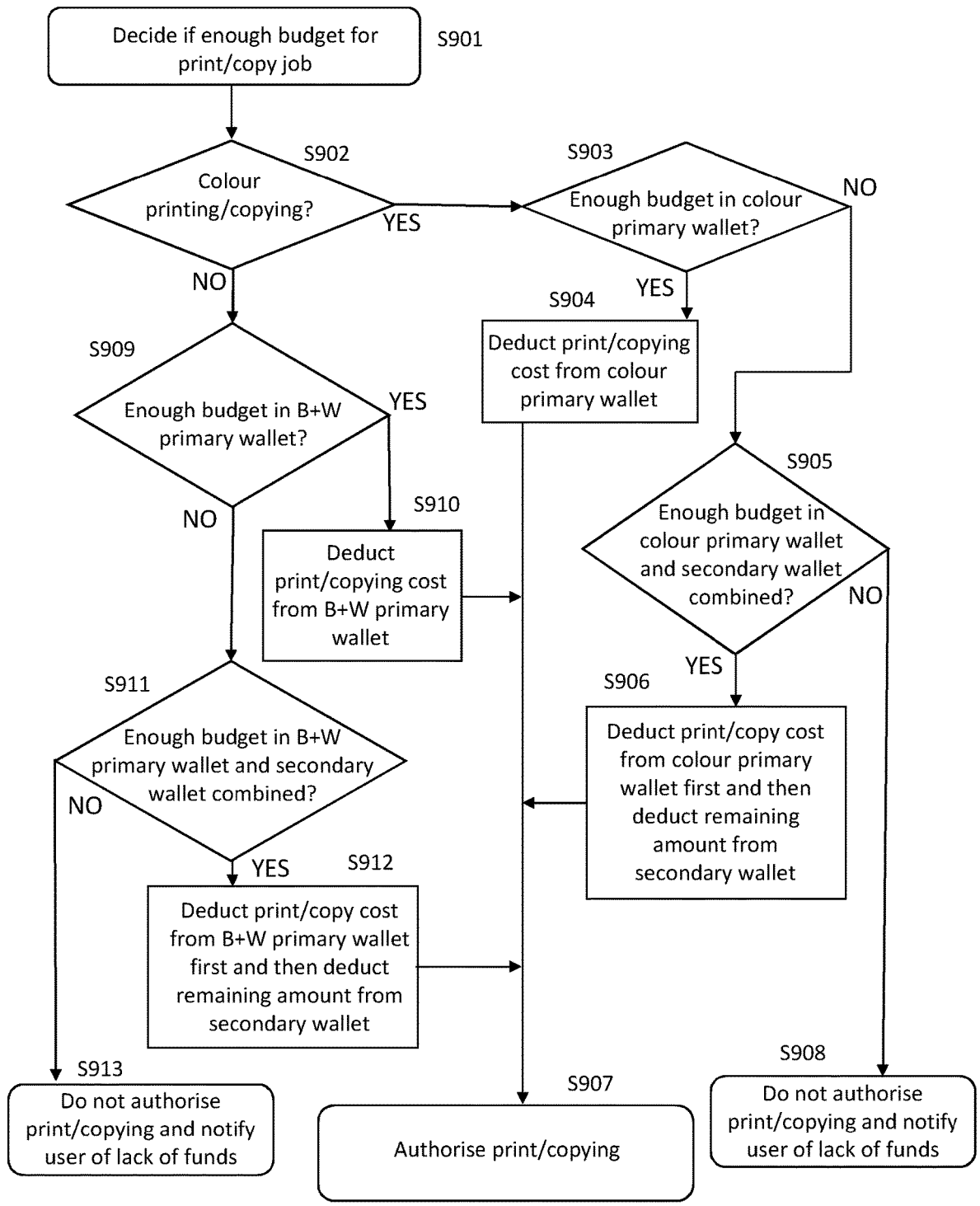
FIG. 9 is a flow diagram showing the steps for deciding if a user has enough funds for a colour or black and white print job or copy job.

The features and processes described in relation to FIGS. 1 to 7 for the first embodiment apply equally for this embodiment. The process of determining whether the user has enough funds in this embodiment is described in more detail with reference FIG. 9. FIG. 9 shows steps S609 of FIGS. 6a and 6b and step S704 of FIG. 7 in relation to this embodiment.

In step S901 of FIG. 9 the cloud service 150 starts the process to decide if the user has enough funds for a print/copy job. In step S902 it is determined whether the user wishes to print/copy in colour. If the user wishes to print/copy in colour, then the process proceeds to step S903. If the user does not wish to print/copy in colour, it is determined that the user wishes to print/copy in black and white and the flow proceeds to step S909.

Steps S903 to S908, and steps S909 to S913, essentially correspond to steps S802 to S807 of FIG. 8, and only the differences with FIG. 8 will be described below.

In step S903 only the colour primary wallet is used to check if the user has enough funds for the colour print/copy job. In step S904 the cost of the print/copy job is deducted from the colour primary wallet. In step S905 the colour primary wallet combined with the secondary wallet is used to determine whether the user has enough funds for the print/copy job, and in step S906 the funds are first taken from the colour primary wallet before the remaining cost is taken from the secondary wallet.

In the case of black and white printing, in step S909 only the black and white primary wallet is used to determine if the user has enough funds. In step S911, the funds available in the black and white primary wallet and secondary wallet combined are used to determine whether the user has enough funds. In step S910 the cost of the print/copy job is deducted from the black and white primary wallet, and in step S912 the funds are first removed from the black and white primary wallet and the remainder of the cost removed from the secondary wallet.

This embodiment provides the advantage of greater flexibility for an administrator to provide a user with free printing/copy. The example is given above in relation to a school, but the embodiment is not limited to this. For example, in a library a user may be given a certain amount of free colour and black and white printing each year (perhaps as part of the local government initiative or as part of a subscription program).

Other Embodiments

An administrator can create multiple wallets for each user. An example has been given above where a primary and secondary wallet are provided, but more than two wallets per user may be provided. The wallets are given a priority order in which the funds are taken. For example, the funds in a primary wallet 410 are always taken before the funds in a secondary wallet 420. If three wallets are provided, the priority order may be first, second and then third.

In the embodiment the funds in the primary wallet 410 are managed by an administrator. The primary wallet funds 410 may be scheduled by an administrator for automatic update every so often (for example every month, every quarter, etc.). An administrator may add the funds to the primary wallet 410 for every user at once, or may add funds for each user individually. The administrator may also remove funds from the primary wallet 410 of each, or an individual, user. In a typical arrangement, a user cannot manage the funds in the primary wallet 410.

Funds in the secondary wallet 420 are typically managed by an individual user. A user can add or remove funds from the secondary wallet 420.

Funds can be added by the administrator to the primary wallet, and by the user to the secondary wallet, using any suitable means. This may be via a website running on client 100 that connects with the cloud service 150, where payment may be made by credit card or debit card, or any other online payment method. Payment could be paid by (online) bank transfer. Payment could be paid by bank standing order (for regular payments). Payment could also be made over the telephone. Payment could also be made by a token system. Any suitable payment method may be used.

In an alternative embodiment, an administrator may manage both the primary wallet and secondary wallet of a user, and user has no means of adding funds to any of the primary wallet and secondary wallet. This arrangement could be used for example where the primary wallet is for colour printing/copying and the secondary wallet is for black and white printing/copying. Once the funds available to a user are exhausted, the user is required to contact the administrator for additional funds. This arrangement may be useful where a parent wishes to control the printing/copy amounts of their children (the parent(s) being the administrator).

The above has described examples where the budget control system is applied to a school, and the user is a student. The embodiments are not limited to this. The described budget control may be applied to any organisation or institution such as a university, college, library, home, or company where budget control of printing and/or copying is desired. The user may be a student, teacher, staff member, child, or anyone where it is desired to apply budget control to their printing/copying activity.

In the above embodiments, the user wallets 402 may record more than just the amount of funds in a user's primary wallet and secondary wallet. The user's wallets 402 may record each of the transactions made by a user. For example, a job id, a job name, user id, username, date, cost of job, remaining total balance from both wallets, may be recorded for each user. Such information may be useful for reporting/accountancy purposes.

The above embodiments describe the use of the cloud service 150. However, the embodiments are not limited this. Instead of the cloud service 150 a local server may be provided instead. The local server may be managed by, and located within, the on-site location in which the printing/copying system is provided. In this case the local sever may be connected to the MFP 110 and client computer 100 via the internal network 120. All the functions and operations described above for the cloud service 150 will be performed by the local server.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments.

The invention claimed is:

1. A printing and copying system comprising:
 a server configured to manage user account information related to a user, the user account information including a plurality of wallets associated with the user, and the plurality of wallets each representing funds available to the user; and
 an apparatus connected to the server, the apparatus configured to send a printing request for a print job, or a copying request for a copy job, to the server in accordance with an instruction from the user,
 wherein the server is configured to determine whether to authorise the printing request or copying request based on the funds available in the plurality of wallets, wherein:
 the plurality of wallets includes a first wallet and a second wallet, and
 the server is configured to determine whether to authorise the printing request or the copying request based on the funds available in the first wallet or the funds available in the first wallet and second wallet combined.

2. The printing and copying system according to claim 1, wherein the funds available in the first wallet take preference over the funds in the second wallet.

3. The printing and copying system according to claim 1, wherein:
if the cost of the print job or the copy job is equal to or less than the funds available in the first wallet, or
if the cost of the print job or the copy job is greater than the funds available in the first wallet but equal to or less than the funds available in the first wallet and second wallet combined,
the server is configured to authorise the printing request or the copying request.

4. The printing and copying system according to claim 3, wherein:
if the cost of the print job or the copy job is equal to or less than the funds available in the first wallet, the cost of the print job or the copy job is deducted from the first wallet before the printing request or the copying request is authorised, and
if the cost of the print job or the copy job is greater than the funds available in the first wallet but equal to or less than the funds available in the first wallet and second wallet combined, the cost of the print job or the copy job is first deducted from the first wallet and the remaining amount of the cost of the print job or the copy job is deducted from the second wallet, before the printing request or the copying request is authorised.

5. The printing and copying system according to claim 1, wherein if the cost of the print job or the copy job is greater than the funds available in the first wallet and second wallet combined, the server is configured not to authorise the printing request or the copying request.

6. The printing and copying system according to claim 1, wherein the funds available in the plurality of wallets represents money or number of sheets.

7. The printing and copying system according to claim 1, wherein the server or the apparatus is configured to determine the cost of the print job or the copy job.

8. The printing and copying system according to claim 1, wherein the cost of the print job or the copy job is money or number of sheets.

9. A printing system comprising:
a client computer configured to generate print data in response to an action from a user;
a server connected to the client computer and configured to manage user account information related to the user, the user account information including a plurality of wallets associated with the user, and the plurality of wallets each representing funds available to the user; and
a printing apparatus connected to the server and configured to send a request for the print data to the server in accordance with a print instruction from the user,
wherein, the server is configured to determine whether the printing apparatus is authorised to receive the print data based on the funds available in the plurality of wallets wherein the plurality of wallets include a first wallet and a second wallet, and the server is configured to determine whether the printing apparatus is authorised to receive the print data based on the funds available in the first wallet or the funds available in the first wallet and second wallet combined.

10. The printing system according to claim 9, wherein the funds available in the first wallet take preference over the funds in the second wallet.

11. The printing system according to claim 9, wherein:
if the cost of printing the print data is equal to or less than the funds available in the first wallet, or
if the cost of printing the print data is greater than the funds available in the first wallet but equal to or less than the funds available in the first wallet and second wallet combined,
the server is configured to authorise the printing apparatus to receive the print data.

12. The printing system according to claim 11, wherein:
if the cost of printing the print data is equal to or less than the funds available in the first wallet, the cost of printing the print data is deducted from the first wallet before the server authorises the printing apparatus to receive the print data, and
if the cost of printing the print data is greater than the funds available in the first wallet but equal to or less than the funds available in the first wallet and second wallet combined, the cost of printing the print data is first deducted from the first wallet and the remaining amount of the cost of printing the print data is deducted from the second wallet, before the server authorises the printing apparatus to receive the print data.

13. The printing system according to claim 9, wherein if the cost of printing the print data is greater than the funds available in the first wallet and second wallet combined, the server does not authorise the printing apparatus to receive the print data.

14. A copying system comprising:
a copying apparatus comprising a scanning device and a printing device; and
a server connected to the copying apparatus and configured to manage user account information related to a user, the user account information including a plurality of wallets associated with the user, and the plurality of wallets each representing funds available to the user,
wherein, in accordance with a copy instruction from the user, the scanning device is configured to scan a document to generate scanned data and send a copy request for printing the scanned data by the printing device to the server, and
wherein the server is configured to determine whether to authorise the copy request based on the funds available in the plurality of wallets, wherein the plurality of wallets include a first wallet and a second wallet, and the server is configured to determine whether to authorise the copy request based on the funds available in the first wallet or the funds available in the first wallet and second wallet combined.

15. The copying system according to claim 14, wherein the funds available in the first wallet take preference over the funds in the second wallet.

16. The copying system according to claim 14, wherein:
if the cost of printing the scanned data by the printing device is equal to or less than the funds available in the first wallet, or
if the cost of printing the scanned data by the printing device is greater than the funds available in the first wallet but equal to or less than the funds available in the first wallet and second wallet combined,
the server is configured to authorise the copy request.

17. The copying system according to claim 16, wherein:
if the cost of printing the scanned data by the printing device is equal to or less than the funds available in the first wallet, the cost of printing the scanned data by the printing device is deducted from the first wallet before the server authorises the copy request, and if the cost of printing the scanned data by the printing device is greater than the funds available in the first wallet but equal to or less than the funds available in the first wallet and second wallet combined, the cost of printing the scanned data by the printing device is first deducted from the first wallet and the remaining amount of the cost of printing the scanned data by the printing device is deducted from the second wallet, before the server authorises the copy request.

18. The copying system according to claim 14, wherein if the cost of printing the scanned data by the printing device is greater than the funds available in the first wallet and second wallet combined, the server is configured not to authorise the copy request.

19. A printing and copying method in a printing and copying system including a server connected to an apparatus, the method comprising:

managing, at the server, user account information related to a user, the user account information including a plurality of wallets associated with the user, and the plurality of wallets each representing funds available to the user;

sending a printing request for a print job or a copying request for a copy job from the apparatus to the server in accordance with an instruction from the user; and determining, at the server, whether to authorise the printing request or copying request based on the funds available in the plurality of wallets, wherein the plurality of wallets include a first wallet and a second wallet, and the determining, at the server, whether to authorise the printing request or copying request is based on the funds available in the first wallet or the funds available in the first wallet and second wallet combined.

* * * * *